(12) United States Patent
Ryan et al.

(10) Patent No.: US 11,920,814 B2
(45) Date of Patent: Mar. 5, 2024

(54) FIRE MITIGATION SYSTEM

(71) Applicant: PRISM CONTROLS INC., Lowell, MI (US)

(72) Inventors: Sean Patrick Ryan, Belding, MI (US); Kyle E. Forbush, Lowell, MI (US); Nikhil Kailas Shinde, Kentwood, MI (US); Sylvester John Bentley, Grand Rapids, MI (US); Timothy Paul Gess, Clarksville, MI (US); Eric William Hansen, Clarksville, MI (US); Douglas S. Powell, Ionia, MI (US)

(73) Assignee: PRISM CONTROLS INC., Grand Rapids, MI (US)

( * ) Notice: Subject to any disclaimer, the term of this patent is extended or adjusted under 35 U.S.C. 154(b) by 0 days.

(21) Appl. No.: 17/702,939

(22) Filed: Mar. 24, 2022

(65) Prior Publication Data

US 2022/0316739 A1    Oct. 6, 2022

Related U.S. Application Data

(60) Provisional application No. 63/169,550, filed on Apr. 1, 2021.

(51) Int. Cl.
*F24F 11/63* (2018.01)
*G05B 19/042* (2006.01)
*G08B 17/06* (2006.01)

(52) U.S. Cl.
CPC ............ *F24F 11/63* (2018.01); *G05B 19/042* (2013.01); *G08B 17/06* (2013.01); *G05B 2219/25011* (2013.01)

(58) Field of Classification Search
CPC .... F24F 11/63; F24F 2110/10; F24F 11/0001; F24F 11/526; F24F 11/89; F24F 11/33; G05B 2219/2614; A01K 1/0047
See application file for complete search history.

(56) References Cited

U.S. PATENT DOCUMENTS

| 4,168,494 A | 9/1979 | Hummel et al. |
| 5,407,129 A | 4/1995 | Carey et al. |

(Continued)

FOREIGN PATENT DOCUMENTS

| CN | 206331316 | 7/2017 |
| CN | 109964823 | 7/2019 |

(Continued)

*Primary Examiner* — Michael W Choi
(74) *Attorney, Agent, or Firm* — PRICE HENEVELD LLP (57) ABSTRACT

A method of controlling an agricultural facility for housing a plurality of animals includes the step of regulating the environment within the agricultural facility with an automated building operational system. An automated thermal event controller is operationally coupled with the automated building operational system and generates a thermal event signal in response to a thermal event in progress, whereby the automated thermal event controller, upon receipt of the thermal event signal indicating that the thermal event is in progress, activates an alarm state. In the alarm state, the automated thermal event controller: sends an alarm signal to a system administrator; places the automated building operational system in a safety-mode condition for a first predetermined time interval; and places the automated building operational system in a normal-mode operational condition after the first predetermined time interval and if a confirmatory signal is not yet then received from the system administrator.

26 Claims, 5 Drawing Sheets

(56) References Cited

U.S. PATENT DOCUMENTS

| | | | |
|---|---|---|---|
| 6,102,793 A | | 8/2000 | Hansen |
| 8,375,634 B2 | | 2/2013 | Brandley et al. |
| 9,743,636 B1 | * | 8/2017 | Casebolt .............. A01K 29/005 |
| 2021/0356153 A1 | * | 11/2021 | Nesler ...................... F24F 11/46 |

FOREIGN PATENT DOCUMENTS

| | | |
|---|---|---|
| KR | 101749860 | 6/2017 |
| KR | 101763484 | 8/2017 |

\* cited by examiner

FIRE MITIGATION SYSTEM

CROSS REFERENCE TO RELATED APPLICATION

Applicant hereby claims the priority benefits under the provisions of 35 U.S.C. § 119, basing said claim of priority on related U.S. Provisional Application No. 63/169,550 filed Apr. 1, 2021, which is incorporated in its entirety herein by reference.

FIELD OF THE INVENTION

The present invention generally relates to a fire mitigation system and, more particularly, to an automated control system for mitigating the spread of fire within an agricultural facility housing one or more animals, while simultaneously preserving the health and safety of such animals in the event of a false alarm.

BACKGROUND OF THE INVENTION

Modern agricultural animal housing facilities commonly used for the breeding, development, and care of agricultural animals, such as poultry, swine, and cattle, may employ a system for regulating the environment within the agricultural facility by way of automated building operational systems in order to provide for the care and wellbeing of the agricultural animals housed therein. Such automated building operational systems may include one or more processing units and a multitude of automated building operational devices controlled by the processing units, such as ventilation fans, air inlet control devices, and exhaust fans, to name just a few, that are used to control the temperature, humidity, air quality, access to, from, and within the agricultural animal housing facility, livestock keeping devices and equipment, and other support systems for the agricultural animal housing facility, such as lighting, heating, and water systems.

In the event of a thermal event, such as a fire, the very automated building operational systems designed to provide for the care and wellbeing of the agricultural animals housed therein may contribute to the spread and acceleration of the thermal event, thereby potentially endangering the agricultural animals housed therein. However, simply shutting down the operation of the automated building operational systems, particularly in the event of a false alarm, likewise may compromise the care and wellbeing of the agricultural animals housed therein. Thus, improvements are desired.

SUMMARY OF THE INVENTION

According to one aspect of the present disclosure, a method of controlling an agricultural facility for housing a plurality of animals includes the step of regulating an environment within the agricultural facility with an automated building operational system, the automated building operational system being capable of remote activation between a normal-mode operational condition and a safety-mode condition. An automated thermal event controller is operationally coupled with the automated building operational system and generates a thermal event signal in response to a thermal event in progress, whereby the automated thermal event controller, upon receipt of the thermal event signal indicating that the thermal event is in progress, activates an alarm state. In the alarm state, the automated thermal event controller: sends an alarm signal to a system administrator; places the automated building operational system in the safety-mode condition for a first predetermined time interval; and places the automated building operational system in the normal-mode operational condition after the first predetermined time interval and if a confirmatory signal is not yet then received from the system administrator.

Additional features of this aspect of the present disclosure may include:

the automated building operational system comprises one or more automated building operational devices, and wherein the one or more automated building operational devices may comprise any of:
a ventilation fan;
an air inlet control device;
an exhaust fan;
an egress or ingress interlock;
a manure conveyor;
a manure drying device;
an egg conveyor;
a feed distribution system;
a cooling device;
a heating device;
an ignitor for the heating device;
a natural gas or propane valve;
an electric power supply switch;
a water supply valve; and
a light switch; and
a lighting device;
when the automated building operational system is in the safety-mode condition, the automated thermal event controller entirely deactivates the one or more building operational devices;
when the automated building operational system is in the safety-mode condition, the automated thermal event controller reduces a function of the one or more building operational devices;
when the automated building operational system is in the safety-mode condition, the automated thermal event controller places the one or building operational devices in the safety-mode condition according to a first predetermined sequence;
when the automated building operational system places the one or more building operational devices in the normal-mode operational condition, after the first predetermined time interval and if a confirmatory signal is not yet then received from the system administrator, the automated thermal event controller places the one or more building operational devices in in the normal-mode operational condition according to a second predetermined sequence;
the remotely controlled air inlet control device comprises a baffle capable of providing fresh or recirculated air and operational between a full open condition and a full closed condition, and wherein the baffle is placed in the full closed position when the automated building operational system is in the safety-mode condition;
when the automated building operational system is in the safety-mode condition, the automated thermal event controller places one or both of a remotely controlled visible alarm and a remotely controlled audible alarm in an alarm actuation condition;
when the automated building operational system further comprises a building system controller and the automated thermal event controller is operationally combined with the building system controller;

when the building system controller and the automated thermal event controller comprise a single controller;

when the step of generating a thermal event signal in response to a thermal event being in progress is generated by any of:
- activation of a manual alarm trigger;
- detection of a predetermined temperature rise within the agricultural facility;
- detection of an anomalous vibration or sound harmonic generated by one or more automated building operational devices;
- detection by a visual observation of the thermal event being in progress within the agricultural facility;
- detection of a predetermined temperature rise in one or more of the automated building operational devices within the agricultural facility;
- detection of a presence of pre-ignition gases or smoke or smoke particles within the agricultural facility;
- detection of a change in behavior of one of more of the animals within the agricultural facility; and
- detection of a thermal event being in progress in an adjacent or proximate agricultural facility;

detection of the predetermined temperature rise within an interior volume of the agricultural facility is obtained through a temperature sensor;

detection by the visual observation of a thermal event being in progress within an interior volume of the agricultural facility is obtained through a thermal imaging device, camera, or CCD device;

detection of the predetermined temperature rise in the one or more automated building operational devices within an interior volume of the agricultural facility is obtained through a temperature sensor or an impedance sensor;

detection of the thermal event being in progress in an adjacent or proximate agricultural facility is obtained through a warning signal from a building system controller or an automated thermal event controller associated with the adjacent or proximate agricultural facility;

the system administrator is a human;

the system administrator is a controller;

the automated thermal event controller, upon receipt of the thermal event signal indicating that the thermal event is in progress, first activates an alert state at which the automated thermal event controller sends an alert signal to the system administrator;

the automated thermal event controller activates a visual and/or audio alarm in the alert state;

the first predetermined time interval is between 5 and 50 minutes;

the first predetermined time interval is between 10 and 20 minutes; and the first predetermined time interval is 15 minutes.

According to another aspect of the present disclosure, a method of optimizing a safety of a plurality of animals contained within an agricultural facility includes the step of regulating an environment of the agricultural facility with an automated building operational system, the automated building operational system comprising one or more animal life support systems capable of remote activation. An automated thermal event controller is operationally coupled with the automated building operational system and monitors the agricultural facility for an occurrence of a thermal event, and generates a thermal event signal upon detection of a thermal event. Upon receipt of the signal that a thermal event is in progress, the automated thermal event controller: sends an alarm signal to a system administrator; places one or more of the animal life support systems in a safety mode condition for a predetermined time interval; and places the animal life support systems in a normal-mode condition mode after the predetermined time interval and if a confirmatory signal is not yet then received from the system administrator.

According to yet another aspect of the present disclosure, a method of responding to a thermal event in an agricultural facility for housing a plurality of animals comprises the steps of: regulating an environment of the agricultural facility with an automated building operational system, the automated building operational system comprising one or more animal support systems capable of remote activation between a full on and a full off condition; operationally integrating an automated thermal event controller with the automated building operational system; monitoring the agricultural facility for an occurrence of a thermal event; generating a thermal event signal upon detection of a thermal event; activating an alert state in response to the thermal event signal at which the automated thermal event controller sends an alert signal to a system administrator; and activating an alarm state in response to the thermal event signal at which the automated thermal event controller: sends an alarm signal to a system administrator; places the automated building operational system in a safety-mode condition for a first predetermined time interval; and places the automated building operational system in a normal-mode operational condition after the first predetermined time interval and if a confirmatory signal is not yet then received from the system administrator.

Additional features of this aspect of the present disclosure may include:
- the alarm state is activated after a predetermined criteria is satisfied after the alert state is activated; and
- a fire alarm controller is operationally integrated with the automated building operational system and a fire response unit is requested if the first predetermined time interval has expired and if a confirmatory signal is not received from the system administrator.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
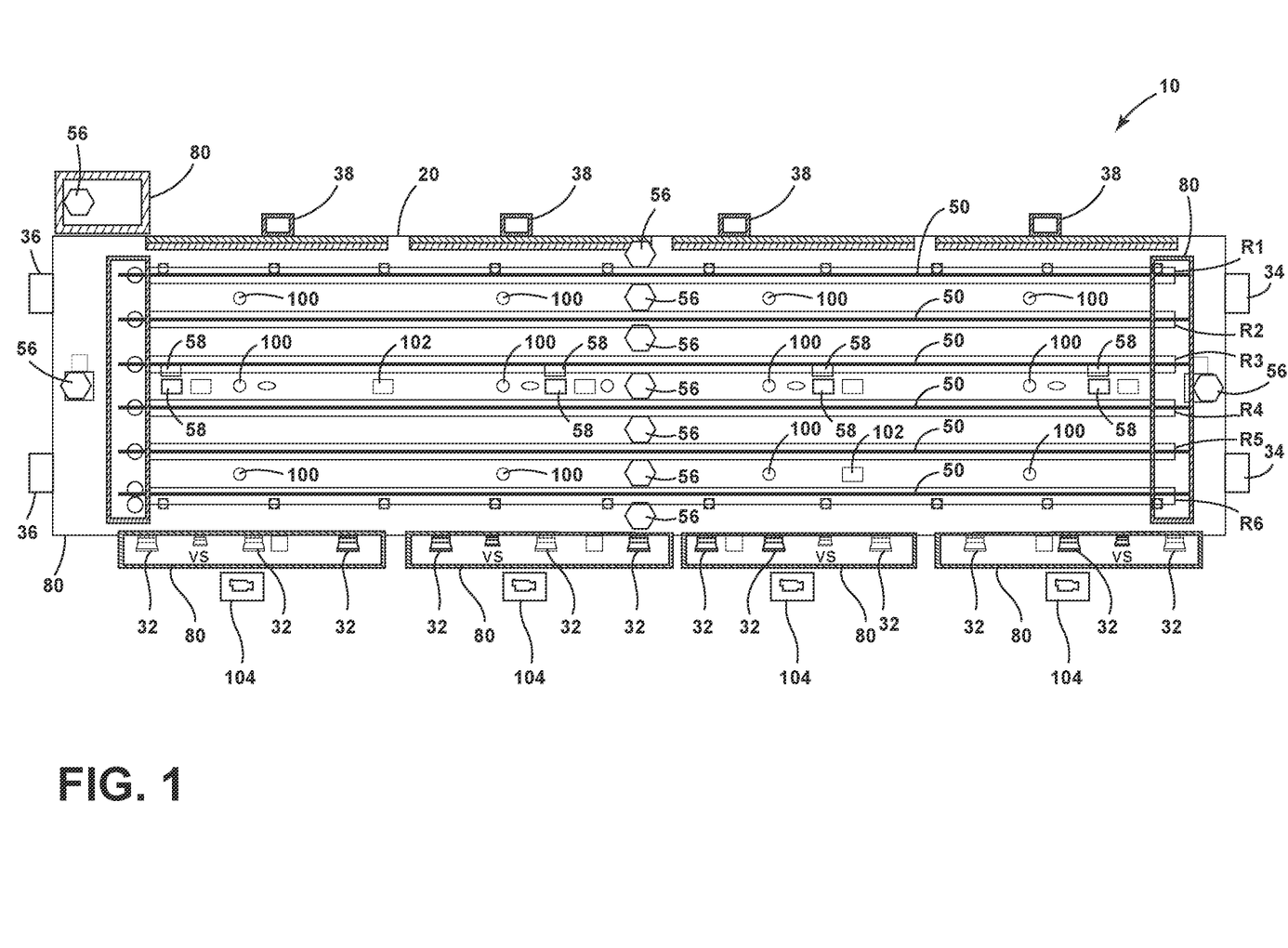
FIG. 1 is a plan schematic view of an agricultural facility for housing a plurality of animals according to the present disclosure.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, an agricultural facility 10 for housing a plurality of animals is shown. The agricultural facility 10 may generally include a building enclosure 20 having a plurality of parallel rows of animal keeping structures R1-R6, such as poultry cages and pens, within which the agricultural animals may be confined. As shown in FIG. 1, for example, six parallel rows of animal keeping structures R1-R6 may be provided within the building enclosure 20.

A variety of automated building operational devices 18 may be employed within the agricultural facility 10, such as egg collection device 22, fan control 24, feed control and feed distribution system 26, manure dryer blower 28, and nest/grid occupancy sensor 30. Such automated building operational devices 18 may also include (but not shown) a water distribution system, an egg conveyor, and a manure conveyor, as are known in the art, as may be provided for the direct care and wellbeing of the agricultural animals and operated under one or more automated building operational devices 18. Environmental control devices and equipment, such ventilation fans 32, air inlet control devices 34, exhaust fans 36, and heating and cooling devices 38, may be used to control the temperature, humidity, and air quality of the environment within the agricultural facility 10 and may be likewise operated under one or more automated operational devices. Other automated building operational devices 18 may include egress or ingress interlocks, ignitors for the heating devices, natural gas or propane valves, electric power supply switches, water supply valves, light switches, and lighting devices. The aforementioned automated building operational devices 18 are not intended to be an exhaustive list, and additional automated building operation devices 18 may be employed.

Figure 2:
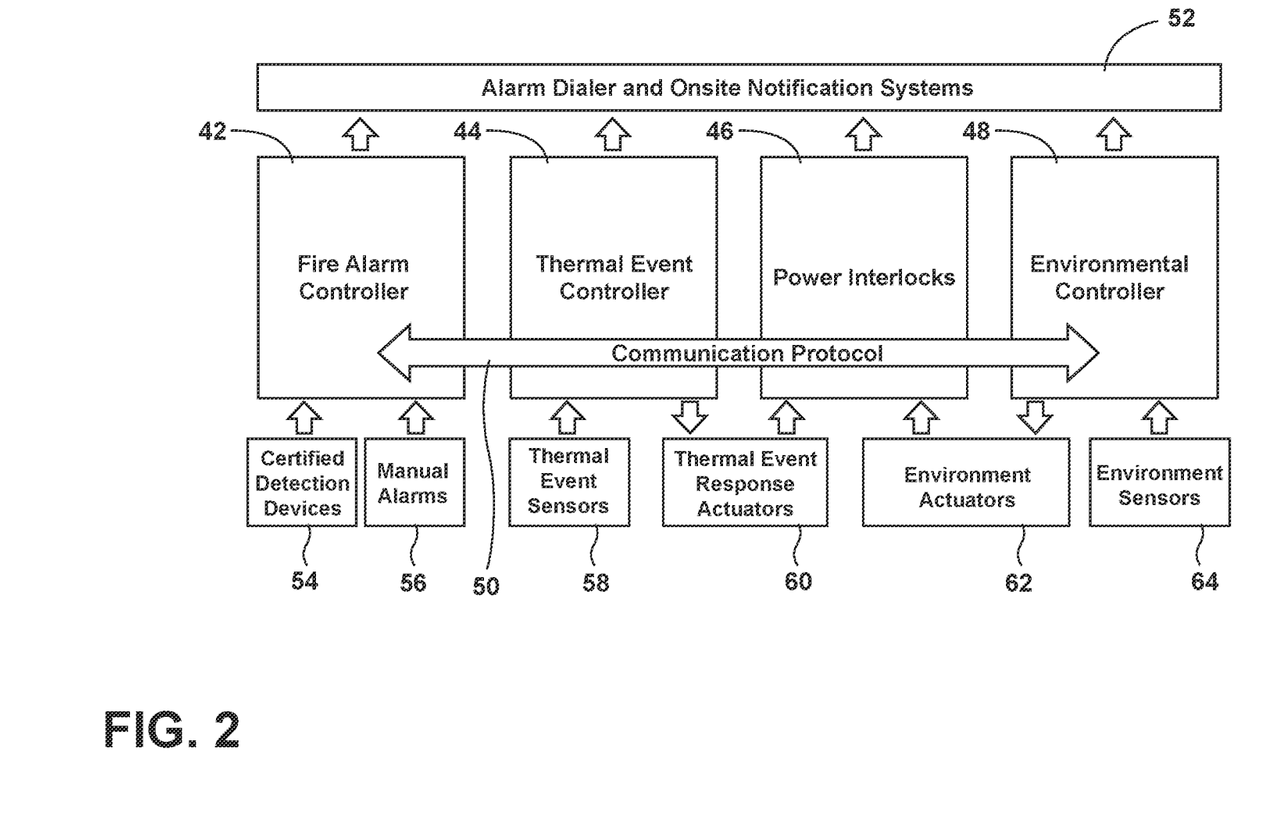
FIG. 2 is a schematic view of the automated building operational system according to the present disclosure.
Figure 5:
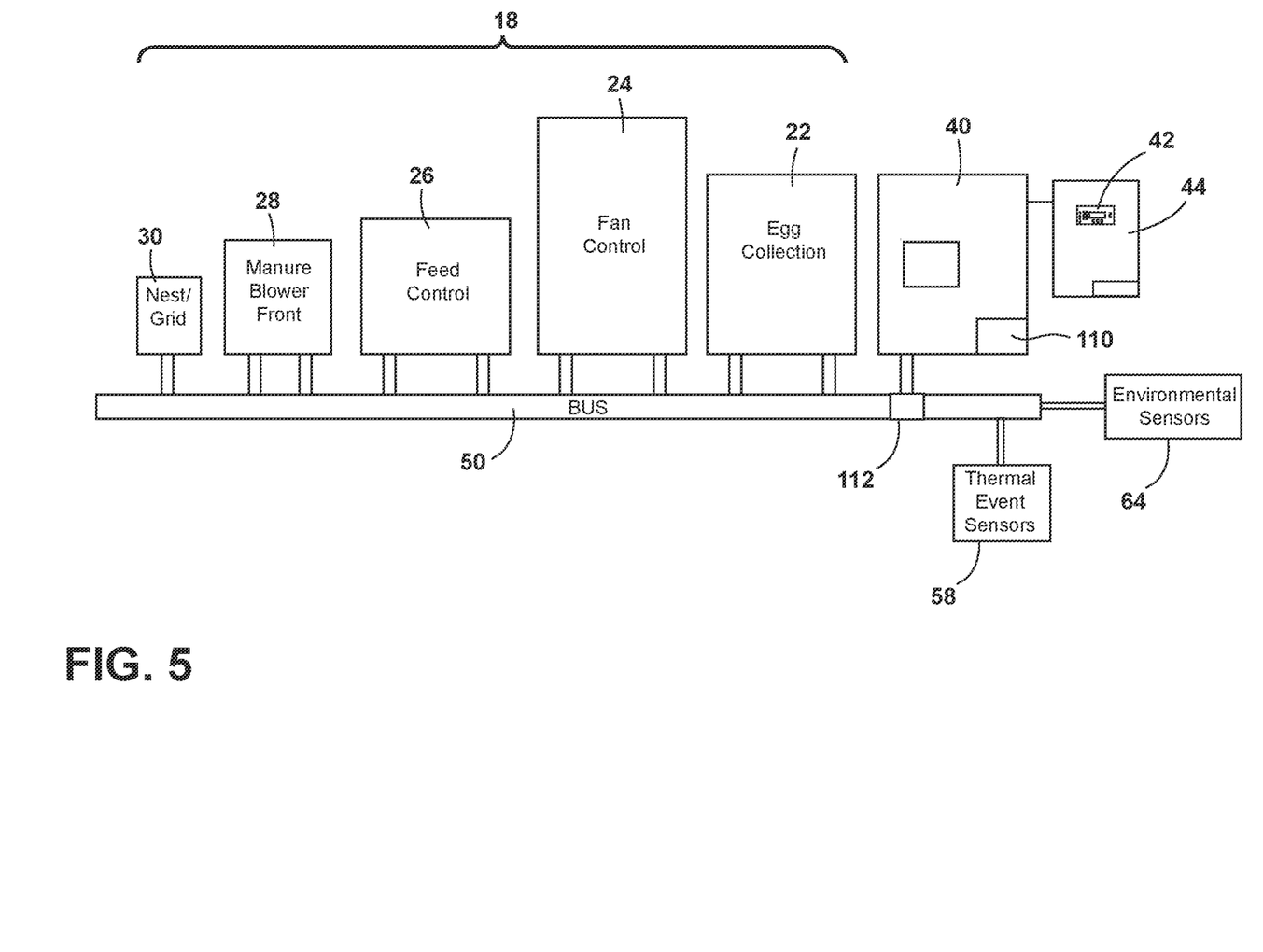
FIG. 5 is a schematic view of the automated building operational devices of the automated building operational system according to the present disclosure.

An automated building operational system 40 may be provided to control the multitude of automated building operational devices 18. The automated building operational system 40 may include a fire alarm controller 42, an automated thermal event controller 44, power interlock controller 46, and an environmental controller 48, all in signal communication with each other, for example, via a communication protocol, which may comprise a common data bus 50, as shown in FIGS. 2 and 5. As further shown in FIG. 2, the various controllers may be in communication with an alarm dialer to an onsite notification system 52. The fire alarm controller 42 may be in signal communication with certified detection devices 54 and manual alarm triggers 56. The automated thermal event controller 44 may be in signal communication with thermal event detection devices 58 and thermal event response actuators 60. In turn, power interlock controller 46 may be in signal communication with the thermal event response actuators 60 and environment actuators 62. Finally, the environmental controller 48 may be in signal communication with the environment actuators 62 and environment sensors 64.

It should be understood that the various controllers of the automated building operational system 40, including the automated thermal event controller 44, may be operationally combined. Indeed, it is contemplated that each of the various controllers of the automated building operational system 40, including the automated thermal event controller 44, may comprise a single controller.

Broadly described, the method of controlling the agricultural facility 10 for housing a plurality of animals according to the present disclosure comprises the step of regulating the environment within the agricultural facility 10 with the automated building operational system 40, the automated building operational system 40 being capable of remote activation between a normal-mode operational condition and a safety-mode condition. The automated thermal event controller 44 may be operationally coupled with the automated building operational system 40 and generates a thermal event signal in response to a thermal event in progress.

The thermal event detection devices 58 may include sensor devices adapted to detect thermal anomalies based on temperature, heat signature, flame sensing, gas detection, smoke or smoke particle detection, optical detection, animal behavior, electrical current, etc. Thermal event detection devices 58 may be distributed in various areas of the agricultural animal housing facility 10. A plurality of manual alarm triggers 56 may also be provided in various areas of the agricultural animal housing facility 10, as shown in FIG. 1. The thermal event detection devices 58 may be adapted to detect thermal anomalies and may be coupled with an automated response to contain and/or slow the spread of a potential fire. The response of the automated thermal event controller 44 may be triggered automatically by the thermal event detection devices 58 or manually by an operator.

The automated thermal event controller 44 may automatically shut down all ventilation systems, close baffles and inlets, and seal the building as much as possible, as well as stop all feed, egg, manure, and other conveyance and shut off electrical, gas, and other utility systems or supplies for a user-defined predetermined period of time. For example, the remotely controlled air inlet control device 34 may comprise a baffle capable of providing fresh or recirculated air and operational between a full open condition and a full closed condition, such that the baffle is placed in the full closed position when the automated building operational system 40 is in the safety-mode condition. The automated thermal event controller 44 response thus may include the bypassing of existing default animal health and safety protocols or features.

If the emergent fire is not confirmed manually by human intervention or by some other highly reliable system by the time the predetermined period of time expires, the automated thermal event controller 44 may default back to the normal-mode operational condition as a protection against animal loss due to a false alarm.

The automated thermal event controller 44 thus determines multiple states, depending on the status of various thermal event detection devices 58, including a normal operational state, an alarm state, and an alert state. The normal operational state exists when the automated building operational system 40 is functioning within specified parameters for all environments and devices that are being monitored, and continues operation of the automated building operational devices 18 in the normal-mode operational condition.

Figure 3:
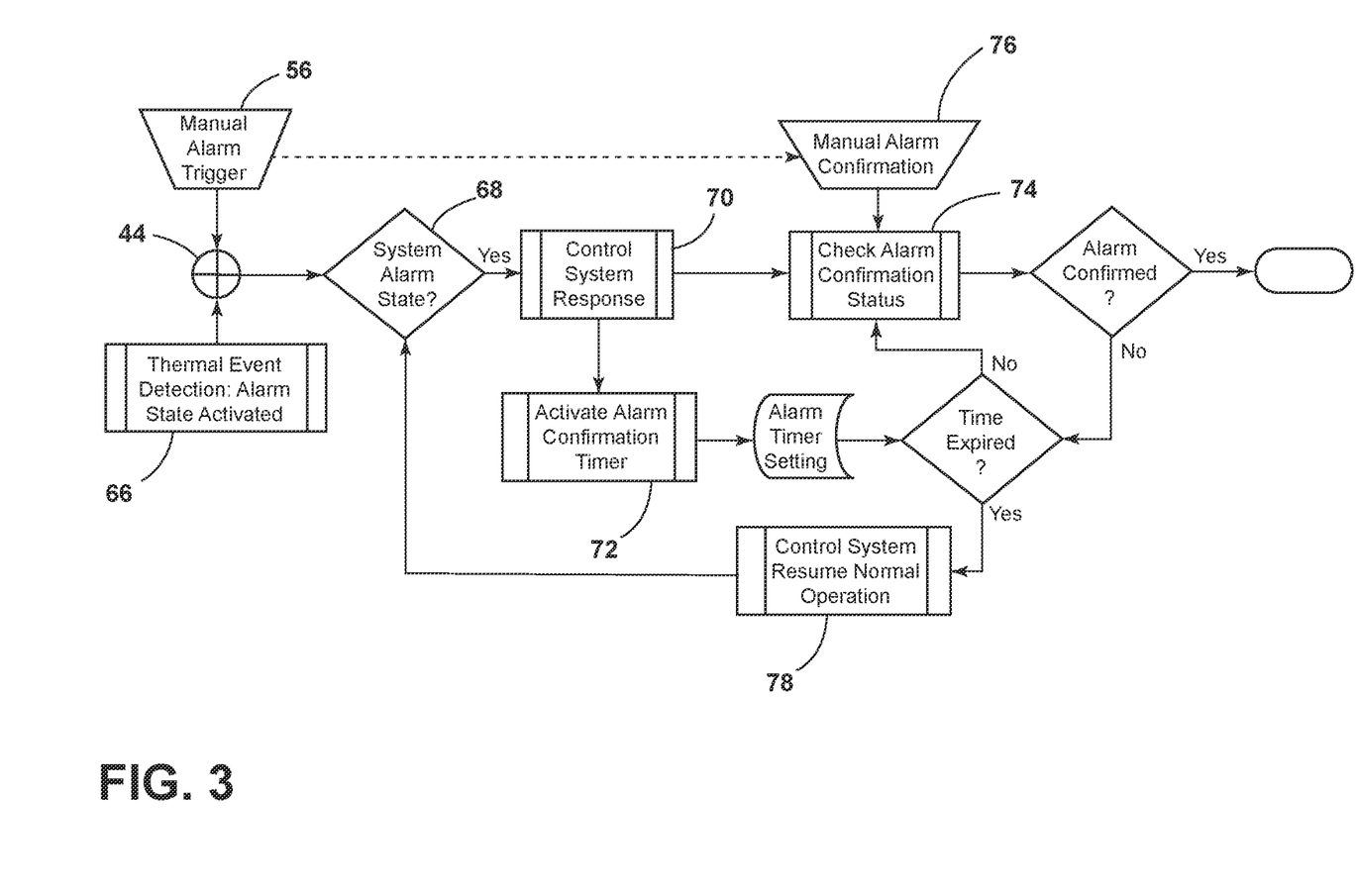
FIG. 3 is a flow chart of the automated building operational system in the alarm state according to the present disclosure.

The alarm state indicates that the automated building operational system 40 response countermeasures have been activated and manual confirmation of an emergent thermal event needs to occur within a specified first predetermined alarm confirmation time. As shown in FIG. 3, the system process flow for the alarm state provides that the automated thermal event controller 44, upon receipt of the thermal event signal indicating that the thermal event is in progress, activates the alarm state at step 66, at which time the automated thermal event controller 44 sends an alarm signal to a system administrator at step 68, places the automated building operational system 40 in the safety-mode condition for the first predetermined time interval at step 70, and activates the alarm confirmation timer at step 72. Subsequently, the automated thermal event controller 44 monitors the alarm confirmation status at step 74. If, within the first predetermined time interval, a manual alarm confirmation is received at step 76, the seating mode condition is maintained and the alarm is confirmed. If, however, a manual alarm confirmation is not received within the first predetermined time interval, the automated thermal event controller 44 places the automated building operational system 40 in the normal-mode operational condition after the first predetermined time interval and if a confirmatory signal is not yet then received from the system administrator at step 78. The system administrator may be a human or a facility controller.

The first predetermined time interval may be between 5 and 50 minutes. Alternatively, the first predetermined time interval may be between 10 and 20 minutes. In particular, the first predetermined time interval may be 15 minutes.

In effect, the safety-mode condition is designed to bypass existing default animal health and safety protocols and instead engage a more robust response, for example, by shutting down all ventilation, motors, and conveyances and starting a clock. If the fire is confirmed by human intervention (or otherwise) prior to the time expiring, the system will remain in the safety-mode condition. If the fire is not confirmed or if the system is manually aborted, it will default back to the normal-mode operating condition.

When the automated building operational system 40 is in the safety-mode condition, the automated thermal event controller 44 may entirely deactivate one or more of the automated building operational devices 18. Alternatively, when the automated building operational system 40 is in the safety-mode condition, the automated thermal event controller 44 may act to reduce the function of the one or more of the automated building operational devices 18. In either case, when the automated building operational system 40 is in the safety-mode condition, the automated thermal event controller 44 may place one or both of a remotely controlled visible alarm and a remotely controlled audible alarm in an alarm actuation condition.

In addition, when in the safety-mode condition, the automated thermal event controller 44 may place one or more of the automated building operational devices 18 in the safety-mode condition according to a first predetermined sequence. Conversely, when the automated building operational system 40 places the one or more of the automated building operational devices 18 in the normal-mode operational condition, after the first predetermined time interval and if a confirmatory signal is not yet then received from the system administrator, the automated thermal event controller 44 may place one or more of the automated building operational devices 18 in the normal-mode operational condition according to a second predetermined sequence. Moreover, it is contemplated that the automated building operational devices 18 of the agricultural facility 10 may be segregated into zones 80 and that the placement of certain or all of the automated building operational devices 18 in or out of the safety-mode condition may be conducted by zones 80 or a sequence of zones 80.

Figure 4:
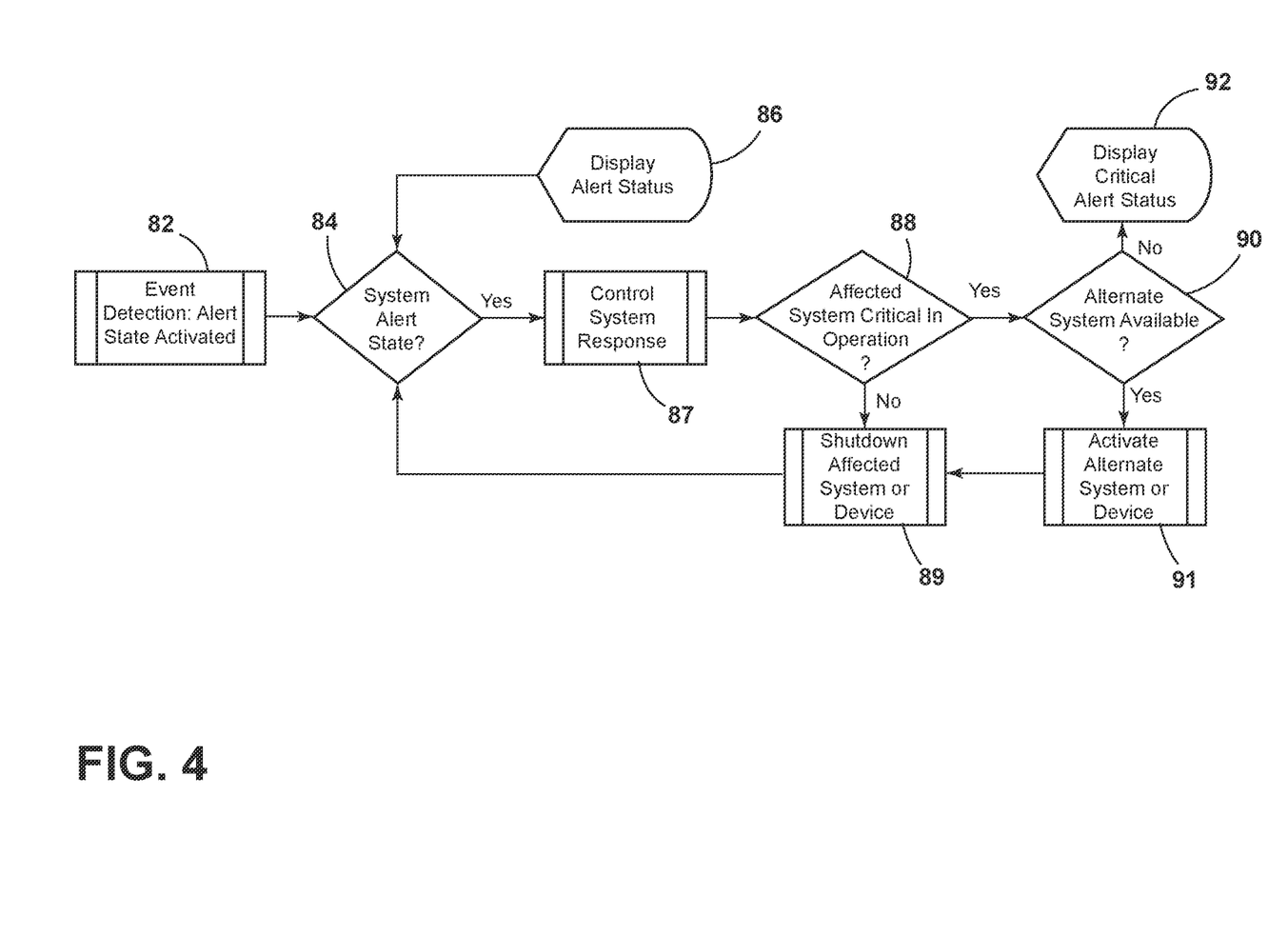
FIG. 4 is a flow chart of the automated building operational system in the alert state according to the present disclosure.

The optional addition of the alert state, shown in FIG. 4, indicates that one or more environments or automated building operational devices 18 that are being monitored are operating outside of normal parameters and should be checked or have preventative maintenance performed. The automated thermal event controller 44, upon receipt of the thermal event signal at step 82 indicating that the thermal event is in progress, may be designed to first activate the alert state at step 84, at which the automated thermal event controller 44 sends an alert signal to the system administrator, but does not immediately place the automated building operational system 40 in the alarm state and in the safety-mode condition unless a predetermined criteria is satisfied. The automated thermal event controller 44 may also activate a visual and/or audio alarm at step 86 in the alert state.

The predetermined criteria at which time the automated thermal event controller transitions from the alert state to the alarm state and thereby places the automated building operational system 40 in the safety-mode condition, as one alterative, may include a second predetermined time interval based on the judgment, experience, and discretion of a human operator. Alternatively, other criteria might be employed, such as the rate of temperature increase of one or more of the automated building operational devices 18. Alternatively at step 88, the automated thermal event controller 44 may determine whether or not the automated building operational device 18 is critical to the function of the agricultural facility 10. In the event that the automated building operational device 18 is not so critical, the automated building operational device 18 may be shut down. In the event that the automated building operational device 18 is critical, at step 90 the automated thermal event controller 44 may determine whether or not an alternative system or device is available. If an alternative system or device is available, the automated thermal event controller 44 may activate the alternative system or device. If an alternative system or device is not available, the automated thermal event controller 44 may display a critical alert status at step 92.

The step of generating a thermal event signal in response to a thermal event being in progress is generated by any of: activation of a manual alarm trigger 56, detection of a predetermined temperature rise within the agricultural facility 10, detection by a visual observation of the thermal event being in progress within the agricultural facility 10, detection of an anomalous vibration or sound harmonic generated by one or more automated building operational devices 18, detection of a predetermined temperature rise in one or more automated building operational devices 18 within the agricultural facility 10, detection of the presence of preignition gases, such as, but not limited to, natural gas or propane, or smoke or smoke particles in the air within the agricultural facility 10, detection of a change in behavior of one of more of the animals within the agricultural facility 10, and detection of a thermal event being in progress in an adjacent or proximate agricultural facility 10.

For example, detection of the predetermined temperature rise within the interior volume of the agricultural facility may be obtained through a temperature sensor 100. Detection of an anomalous vibration or sound harmonic generated by one or more automated building operational devices 18 may be obtained through a vibration sensor or a microphone (not shown). Detection by the visual observation of a thermal event being in progress within the interior volume of the agricultural facility may be obtained through a thermal imaging device, camera, or CCD device 102. Detection of the predetermined temperature rise in one or more devices within the interior volume of the agricultural facility may be obtained through a temperature sensor or an impedance sensor (not shown). Detection of the thermal event being in progress in an adjacent or proximate agricultural facility 10 may be obtained through a warning signal from a building system controller or an automated thermal event controller associated with the adjacent or proximate agricultural facility. Detection by the use of thermal imaging device 104, as shown in as shown in FIG. 1, may be used to detect heat signatures from outside of the structure of the agricultural facility 10.

In addition, the common data bus 50 may be used for communication of sensor signals and data, such as such 1-Wire® integrated sensor buses available from Maxim Integrated, as shown in FIGS. 2 and 5. Through the common data bus 50, the fire alarm controller 42, the automated thermal event controller 44, the power interlock controller 46, and the environmental controller 48 may gather maintenance and operational data from the distributed certified detection devices 54, thermal event detection devices 58, thermal event response actuators 60, environmental actuators 62 and environmental sensors 64 mounted in areas and on automated building operational devices 18 with some operational risk. This sensor network may be composed of several components. First, the fire alarm controller 42, the automated thermal event controller 44, the power interlock controller 46, and the environmental controller 48 may gather information from one or more sensor loops, collate the data, provide visualization and annunciation to the users, and communicate alarms. The fire alarm controller 42, the automated thermal event controller 44, the power interlock controller 46, and the environmental controller 48 may also be responsible for identifying normal operating conditions and alerting on abnormal events. Such a common data bus 50 may provide a simple, low cost network or array of sensors that communicates information as to the precise operational device exhibiting a perimeter or behavior of interest. Of course, manual alarm triggers 56 may be placed throughout the agricultural facility 10 in areas that are accessible to agricultural facility personnel.

The distributed certified detection devices 54, thermal event detection devices 58, thermal event response actuators 60, environmental actuators 62, and/or environmental sensors 64 may be mounted on every automated building operational device 18 in the agricultural facility 10 and may be capable of sensing temperature, vibration, sound, hall effect, and other physical parameters. As shown in FIG. 5, such automated building operational devices 18 may include the egg collection device 22, fan control 24, feed control and feed distribution system 26, manure dryer blower 28, and nest/grid occupancy sensor 30.

As shown in FIG. 5, localized gas, smoke, or smoke particle detection or thermal imaging may be used in the control room areas and in other areas of higher motor density to ensure the most rapid detection possible in those areas. For example, as further shown in FIG. 5, the automated thermal event controller 44 may be disposed within a fire rated control box 106 used in concert with the detection systems described above to identify a thermal event. The automated thermal event controller 44 may notify the agricultural facility 10 of the thermal event using standard industry accepted means of redundant communication, as described above. The automated thermal event controller 44 may notify the environmental controller 48 of the thermal event detection, causing the environmental controller 48 to respond by bypassing existing default bird health and safety protocols and engaging the safety-mode condition, shutting down all ventilation, motors, all feed, egg, manure conveyances, and shut off other electrical systems, as well as starting a clock or timer. If the fire is confirmed by human intervention prior to the predetermined period of time expiring, the environmental controller 48 may stay in the safety-mode condition. If the fire is not confirmed or if the system is manually aborted, the environmental controller 48 may default back to the normal-mode operational condition.

The common data bus 50 may include one or more communication loop drivers 110 meeting provide redundant communication channels and power over a single communication protocol. The redundant communications channels will be designed such that options for prioritizing either latency or bandwidth are available. One or more data concentration nodes 112 may interface between the communication loop driver 110 and the common data bus 50. The nodes 112 may be addressable and may cooperate with the communication loop driver 110 to diagnose both board level and cable segment failures. This diagnostic information will be communicated to the user to expedite any necessary repairs. The nodes 112 will be distributed throughout the building.

Each node 112 may interface with one or more common data buses 50 of addressable sensors, such as thermal event detection sensors 58 and environmental sensors 64. These common data buses 50 may be wired or wireless. The nodes 112 may be designed so the common data buses 50 running in different directions will be isolated from each other for troubleshooting purposes. The common data buses 50, thermal event detection sensors 58, and environmental sensors 64 may be designed to distinguish between a sensor failure and an actual thermal event detection sensors 58, and environmental sensors 64 may monitor one or more conditions and be designed to be readily installed where risks are identified. The thermal event detection sensors 58 and environmental sensors 64 may monitor one or more of the following and perform any signal processing to combine the raw data into applicable conditions: motor or powered device temperature; vibration; electrical current; magnetic, electrical or electromagnetic fields; sound; heater discharge and/or case temperature; ambient temperature; lighting equipment power conditions; ambient light; dust and/or other environmental conditions; and/or any other parameters pertinent to a given automated building operational device 18 class. Each monitored condition, automated building operational device 18, and status may be used for preventative maintenance requirements, recordkeeping, and/or extreme event response.

Alternatively or additionally, the communication protocol may comprise fiber optic cables (not shown), such as linear fiber optic heat detection systems comprising continuous linear thermometers, that may be extended along each of the rows R1-R6 of the animal keeping structures, such as poultry cages and pens, within which the agricultural animals may be confined to detect rapid heat rise within the interior of the agricultural facility 10.

Also, a method of optimizing the safety of a plurality of animals contained within an agricultural facility 10 is disclosed. The steps include regulating the environment of the agricultural facility 10 with an automated building operational system 40, the automated building operational system 40 comprising one or more animal life support systems capable of remote activation, operationally coupling an automated thermal event controller 44 with the automated building operational system 40, monitoring the agricultural facility 10 for the occurrence of a thermal event, and generating a thermal event signal upon detection of a thermal event. The automated thermal event controller 44, upon receipt of the signal that a thermal event is in progress, sends an alarm signal to a system administrator, places one or more of the animal life support systems in a safety mode condition for a predetermined time interval, and places the animal life support systems in a normal-mode operational condition mode after the predetermined time interval and if a confirmatory signal is not yet then received from the system administrator.

Finally, a method of responding to a thermal event in an agricultural facility 10 for housing a plurality of animals is disclosed. The steps include regulating the environment of the agricultural facility with an automated building operational system 40, the automated building operational system 40 comprising one or more animal support systems capable of remote activation between a full on and a full off condition, operationally integrating an automated thermal event controller 44 with the automated building operational system 40, monitoring the agricultural facility or the occurrence of a thermal event, generating a thermal event signal upon detection of a thermal event, activating an alert state in response to the thermal event signal at which the automated thermal event controller 44 sends an alert signal to a system administrator, and activating an alarm state in response to the thermal event signal at which the automated thermal event controller 44 sends an alarm signal to a system administrator, places the automated building operational system 40 in the safety-mode condition for a first predetermined time interval, and places the automated building operational system 40 in a normal-mode operational condition after the first predetermined time interval and if a confirmatory signal is not yet then received from the system administrator.

The alarm state may be activated after the alert state is activated. Further, the fire alarm controller 42 may be operationally integrated with the automated building operational system 40 and a fire response unit (such as emergency response personnel) may be requested if the first predetermined time interval has expired and if a confirmatory signal is not received from the system administrator.

It will be understood by one having ordinary skill in the art that construction of the described disclosure and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A method of controlling an agricultural facility for housing a plurality of animals comprising the steps of:
    regulating an environment within the agricultural facility with an automated building operational system, the automated building operational system being capable of remote activation between a normal-mode operational condition and a safety-mode condition;
    operationally coupling an automated thermal event controller with the automated building operational system; and
    generating a thermal event signal in response to a thermal event in progress;
    whereby the automated thermal event controller, upon receipt of the thermal event signal indicating that the thermal event is in progress, activates an alarm state at which the automated thermal event controller:
    sends an alarm signal to a system administrator;
    places the automated building operational system in the safety-mode condition for a first predetermined time interval; and
    places the automated building operational system in the normal-mode operational condition after the first predetermined time interval and if a confirmatory signal is not yet then received from the system administrator.

2. The method of claim 1, wherein the automated building operational system comprises one or more automated building operational devices, and wherein the one or more automated building operational devices may comprise any of:
    a ventilation fan;
    an air inlet control device;
    an exhaust fan;
    an egress or ingress interlock;

a manure conveyor;
a manure drying device;
an egg conveyor;
a feed distribution system;
a cooling device;
a heating device;
an ignitor for the heating device;
a natural gas or propane valve;
an electric power supply switch;
a water supply valve; and
a light switch; and
a lighting device.

3. The method of claim 2, wherein when the automated building operational system is in the safety-mode condition, the automated thermal event controller entirely deactivates the one or more building operational devices.

4. The method of claim 2, wherein when the automated building operational system is in the safety-mode condition, the automated thermal event controller reduces a function of the one or more building operational devices.

5. The method of claim 2, wherein when the automated building operational system is in the safety-mode condition, the automated thermal event controller places the one or more building operational devices in the safety-mode condition according to a first predetermined sequence.

6. The method of claim 2, wherein when the automated building operational system places the one or more building operational devices in the normal-mode operational condition, after the first predetermined time interval and if a confirmatory signal is not yet then received from the system administrator, the automated thermal event controller places the one or more building operational devices in in the normal-mode operational condition according to a second predetermined sequence.

7. The method of claim 2, wherein the remotely controlled air inlet control device comprises a baffle capable of providing fresh or recirculated air and operational between a full open condition and a full closed condition, and wherein the baffle is placed in the full closed position when the automated building operational system is in the safety-mode condition.

8. The method of claim 1, wherein when the automated building operational system is in the safety-mode condition, the automated thermal event controller places one or both of a remotely controlled visible alarm and a remotely controlled audible alarm in an alarm actuation condition.

9. The method of claim 1, wherein when the automated building operational system further comprises a building system controller and the automated thermal event controller is operationally combined with the building system controller.

10. The method of claim 9, wherein when the building system controller and the automated thermal event controller comprise a single controller.

11. The method of claim 1, wherein when the step of generating a thermal event signal in response to a thermal event being in progress is generated by any of:
activation of a manual alarm trigger;
detection of a predetermined temperature rise within the agricultural facility;
detection of an anomalous vibration or sound harmonic generated by one or more automated building operational devices;
detection by a visual observation of the thermal event being in progress within the agricultural facility;
detection of a predetermined temperature rise in one or more of the automated building operational devices within the agricultural facility;
detection of a presence of pre-ignition gases, smoke, or smoke particles within the agricultural facility;
detection of a change in behavior of one of more of the animals within the agricultural facility; and
detection of a thermal event being in progress in an adjacent or proximate agricultural facility.

12. The method of claim 11, wherein detection of the predetermined temperature rise within an interior volume of the agricultural facility is obtained through a temperature sensor.

13. The method of claim 11, wherein detection by the visual observation of a thermal event being in progress within an interior volume of the agricultural facility is obtained through a thermal imaging device, camera or CCD device.

14. The method of claim 11, wherein detection of the predetermined temperature rise in the one or more automated building operational devices within an interior volume of the agricultural facility is obtained through a temperature sensor or an impedance sensor.

15. The method of claim 11, wherein detection of the thermal event being in progress in an adjacent or proximate agricultural facility is obtained through a warning signal from a building system controller or an automated thermal event controller associated with the adjacent or proximate agricultural facility.

16. The method of claim 1, wherein the system administrator is a human.

17. The method of claim 1, wherein the system administrator is a controller.

18. The method of claim 1, whereby the automated thermal event controller, upon receipt of the thermal event signal indicating that the thermal event is in progress, first activates an alert state at which the automated thermal event controller sends an alert signal to the system administrator.

19. The method of claim 18, wherein the automated thermal event controller activates a visual and/or audio alarm in the alert state.

20. The method of claim 1, wherein the first predetermined time interval is between 5 and 50 minutes.

21. The method of claim 1, wherein the first predetermined time interval is between 10 and 20 minutes.

22. The method of claim 1, wherein the first predetermined time interval is 15 minutes.

23. A method of optimizing a safety of a plurality of animals contained within an agricultural facility comprising the steps of:
regulating an environment of the agricultural facility with an automated building operational system, the automated building operational system comprising one or more animal life support systems capable of remote activation;
operationally coupling an automated thermal event controller with the automated building operational system;
monitoring the agricultural facility for an occurrence of a thermal event; and
generating a thermal event signal upon detection of a thermal event;
whereby the automated thermal event controller, upon receipt of the thermal event signal that a thermal event is in progress:
sends an alarm signal to a system administrator;

places one or more of the animal life support systems in a safety mode condition for a predetermined time interval; and places the animal life support systems in a normal-mode operational condition mode after the predetermined time interval and if a confirmatory signal is not yet then received from the system administrator.

24. A method of responding to a thermal event in an agricultural facility for housing a plurality of animals comprising the steps of:

regulating the environment of the agricultural facility with an automated building operational system, the automated building operational system comprising one or more animal support systems capable of remote activation between a full on and a full off condition;

operationally integrating an automated thermal event controller with the automated building operational system;

monitoring the agricultural facility for an occurrence of a thermal event;

generating a thermal event signal upon detection of a thermal event;

activating an alert state in response to the thermal event signal at which the automated thermal event controller sends an alert signal to a system administrator; and activating an alarm state in response to the thermal event signal at which the automated thermal event controller:

sends an alarm signal to a system administrator;

places the automated building operational system in a safety-mode condition for a first predetermined time interval; and places the automated building operational system in a normal-mode operational condition after the first predetermined time interval and if a confirmatory signal is not yet then received from the system administrator.

25. The method of claim 24, wherein the alarm state is activated after a predetermined criteria is satisfied after the alert state is activated.

26. The method of claim 24, wherein a fire alarm controller is operationally integrated with the automated building operational system and a fire response unit is requested if the first predetermined time interval has expired and if a confirmatory signal is not received from the system administrator.

* * * * *